United States Patent Office 3,826,660
Patented July 30, 1974

3,826,660
HIGH INDEX OPTICAL GLASS
James Matthew Wylot and Edgar Joseph Greco, Rochester, N.Y., assignors to Eastman Kodak Company, Rochester, N.Y.
No Drawing. Filed Sept. 5, 1972, Ser. No. 286,497
Int. Cl. C03c 3/10
U.S. Cl. 106—53                                2 Claims

ABSTRACT OF THE DISCLOSURE

An optical glass having a high index of refraction, high dispersion and low absorption in the visible region of the spectrum produced from melts comprising lead oxide (PbO), silicon dioxide ($SiO_2$) and sodium chloride (NaCl). Glasses according to this invention may also include components selected from the group consisting of tellurium dioxide ($TeO_2$) and lithium chloride (LiCl).

CROSS REFERENCE TO RELATED APPLICATIONS

Reference is made to commonly assigned copending U.S. Patent Application Ser. No. 286,498, filed Sept. 5, 1972, in the names of Edgar Joseph Greco and James Matthew Wylot.

BACKGROUND OF THE INVENTION

Field of the Invention

This invention relates to optical glasses, and in particular to optical glasses having a high index of refraction, high dispersion and low absorption in the visible region of the spectrum.

Description of the Prior Art

It is well known in the glass and lens making arts that optical glasses having high indices of refraction, high dispersion and low absorption in the visible region of the spectrum would be of great utility in photographic systems. A high index of refraction permits reduction of the curvature required in a lens element to produce a desired optical performance, thereby making lens production simpler and less expensive and permitting production of otherwise impractical lenses. Low absorption in the visible region of the spectrum, i.e. low color, is desirable in a protographic lens since it permits satisfactory exposure with lower ambient illumination and because distortion of scene color by the lens system is minimized. Finally, high dispersion permits greater correction of chromatic aberrations, thereby permitting the designer more freedom in selection of lenses which would otherwise be unusable in a photographic system.

Flint glasses which are characterized by a high index of refraction have long been known and studied by glass technologists. Included within these known glasses is the basic lead-silicate system to which small amounts of $Na_2O$ may be added by addition of $Na_2CO_3$ to the melt. However, high index lead-silicate glasses have been characterized by a yellow color and have also been extremely corrosive to standard melting and stirring equipment.

SUMMARY OF THE INVENTION

An object of the present invention is to provide an optical flint glass having low absorption in the visible region of the spectrum.

Another object is to provide such an optical glass having a high index of refraction.

Another object is to provide such an optical glass having high dispersion.

Still another object is to provide such an optical glass which is durable.

It has been found that these and other objects are accomplished according to the present invention by the substitution of sodium chloride (NaCl) in place of sodium oxide ($Na_2O$), as utilized in prior art glasses, to provide optical glasses comprising components in the following ranges of percentages by weight:

| Component: | Weight percent |
|---|---|
| Lead oxide (PbO) | 70–85 |
| Silicon dioxide ($SiO_2$) | 14–20 |
| Sodium chloride (NaCl) | 0.10–6 |

In addition to the foregoing embodiments, amounts of tellurium dioxide ($TeO_2$) and/or lithium chloride (LiCl) may be added to the glass compositions disclosed above.

DETAILED DESCRIPTION OF THE PREFERRED EMBODIMENTS OF THE INVENTION

The present invention provides optical glasses which are extremely well suited for lens systems or optical elements of the type used in photographic equipment. By way of example, optical glasses according to this invention have been produced from melts having the compositions by weight percent listed in the following tables. Table I illustrates examples of glass compositions in which about 1–6% sodium chloride has been added to the basic lead-silicate system containing PbO 75–84% and 14–20% $SiO_2$. These glasses were fired in gold crucibles at a temperature of 900° C.

TABLE I

| Melt | PbO | $SiO_2$ | NaCl | $n_D$ | $V_D$ |
|---|---|---|---|---|---|
| 43 | 79.0 | 16.0 | 5.0 | 1.941 | 18.9 |
| 78 | 83.1 | 15.9 | 1.0 | 1.993 | 18.4 |
| 108 | 80.1 | 15.0 | 4.9 | 1.953 | 18.9 |
| 109 | 80.7 | 14.4 | 4.9 | 1.960 | 18.5 |
| 110 | 79.4 | 15.6 | 5.0 | 1.939 | 19.3 |
| 111 | 79.7 | 14.9 | 5.4 | 1.947 | 18.9 |
| 112 | 80.4 | 15.1 | 4.5 | 1.948 | 18.9 |
| 149 | 75.0 | 20.0 | 5.0 | | |

Each of these glasses is characterized by a high index of refraction, all having an index in excess of 1.90. Each of these glasses is also characterized by high dispersion, all having an Abbé number between 18 and 20.

Moreover, each of these glasses exhibit reduced color absorption in comparison with presently available high index flint glasses. Table II illustrates by comparing transmission at three different wavelengths through a 10 mm. section of melt 108 and a 10 mm. section of a commercially available high index flint glass.

TABLE II

| Sample | 400 mμ | 450 mμ | 500 mμ |
|---|---|---|---|
| 108, percent | 25 | 74 | 81 |
| Prior art glass, percent | 15 | 67 | 79 |

It may be seen that glasses according to this invention provide improvement over a presently available glass since melt 108 has less absorption through a 10 mm. section at all measured wavelengths than the absorption through a 10 mm. section of a glass presently available. The transmission data was obtained by measurements of uncoated samples. Thus, it ignores the effect of reflection losses from the surfaces of each sample, which would account for a transmission loss of approximately 20 percent. Each sample would approach 100 percent transmission at higher wavelengths if properly coated.

Practice of this invention is not restricted to the addition of sodium chloride to a glass having only lead and silicate as components (Melts J110 and J114). By way of example, Table III illustrates glass compositions, disclosed in referenced related application U.S. Ser. No.

286,498, filed Sept. 5, 1972, in the names of Greco and Wylot, in which other components have been added to the lead-silicate system, in addition to sodium chloride. These glasses were fired in gold crucibles at temperatures in the range from 900–950° C. Each of these glasses is also characterized by a high index of refraction, greater than 1.90, high dispersion, between 19 and 21, and low color.

TABLE III

| Melt | PbO | SiO$_2$ | NaCl | TeO$_2$ | LiCl | $n_D$ | $V_D$ |
|---|---|---|---|---|---|---|---|
| J106 | 76.71 | 14.44 | 1.00 | 4.00 | 3.85 | 1.968 | 19.3 |
| J107 | 74.71 | 14.44 | 1.00 | 6.00 | 3.85 | 1.948 | 19.8 |
| J109 | 72.71 | 14.44 | 1.00 | 8.00 | 3.85 | 1.960 | 19.7 |
| J110 | 76.71 | 14.44 | 4.85 | 4.00 | | 1.960 | 18.9 |
| J114 | 70.71 | 14.44 | 4.85 | 10.00 | | 1.944 | 19.6 |
| 812 | 71.33 | 17.21 | 0.25 | 10.96 | 0.25 | 1.949 | 20.36 |

To illustrate practice of this invention, a sample of Melt 812 in the tellurium-lead-silicon system was prepared from the following components:

| Component: | Weight (gms.) |
|---|---|
| PbO | 5735 |
| TeO$_2$ | 881 |
| SiO$_2$ | 1384 |
| LiCl | 20 |
| NaCl | 20 |

The components were blended together in a twin-shell blender for a period of thirty minutes. The melt was then fired for three hours in a gold crucible at a temperature of 950° C. Stirring was now begun with a three-bladed, three-tiered gold stirrer at 200 r.p.m. After stirring for a period of one hour, the temperature of the melt was reduced to 850° C. and stirring was continued for three more hours. The glass was then cast onto a cast iron table maintained at a temperature of 270° C. and subsequently was annealed at a temperature of 375° C. As indicated in Table IV, the resultant glass has an index of refraction of 1.9491, an Abbé number 20.36 and the following composition by weight percent:

| Component: | Weight (percent) |
|---|---|
| PbO | 71.33 |
| TeO$_2$ | 10.96 |
| SiO$_2$ | 17.21 |
| NaCl | 0.25 |
| LiCl | 0.25 |

The invention has been described in detail with particular reference to the preferred embodiments thereof but it will be understood that variations and modifications can be effected within the spirit and scope of the invention.

We claim:
1. Optical glasses consisting essentially of components in the following range of percentages by weight:

| Component: | Weight (percent) |
|---|---|
| Lead oxide (PbO) | 75–84 |
| Silicon dioxide (SiO$_2$) | 14–20 |
| Sodium chloride (NaCl) | 1–6 |

2. Optical glasses consisting essentially of components in the following range of percentages by weight:

| Component: | Weight (percent) |
|---|---|
| Lead oxide (PbO) | 70–77 |
| Tellurium dioxide (TeO$_2$) | 4–10 |
| Silicon dioxide (SiO$_2$) | 14–15 |
| Sodium chloride (NaCl) | 4–5 |

References Cited

UNITED STATES PATENTS

| 2,673,809 | 3/1954 | Weissenberg et al. | 106—47 R |
| 3,649,311 | 3/1972 | Aravjo | 106—54 |

FOREIGN PATENTS

| 736,073 | 8/1955 | Great Britain | 106—47 Q |
| 1,425,496 | 12/1965 | France | 106—53 |
| 214,055 | 5/1968 | USSR | 106—52 |

OTHER REFERENCES

Dennis et al., "Germanium Glasses," 9, p. 184 (1925), J. Soc. Glass Tech., 106–53.

HELEN P. McCARTHY, Primary Examiner

U.S. Cl. X.R.

106—47 Q